Oct. 28, 1958
E. W. REYNOLDS
2,857,871
SYSTEM FOR MAINTAINING A STRAIGHT SEAM IN
THE MANUFACTURE OF TUBING
Filed Dec. 8, 1953
4 Sheets-Sheet 3
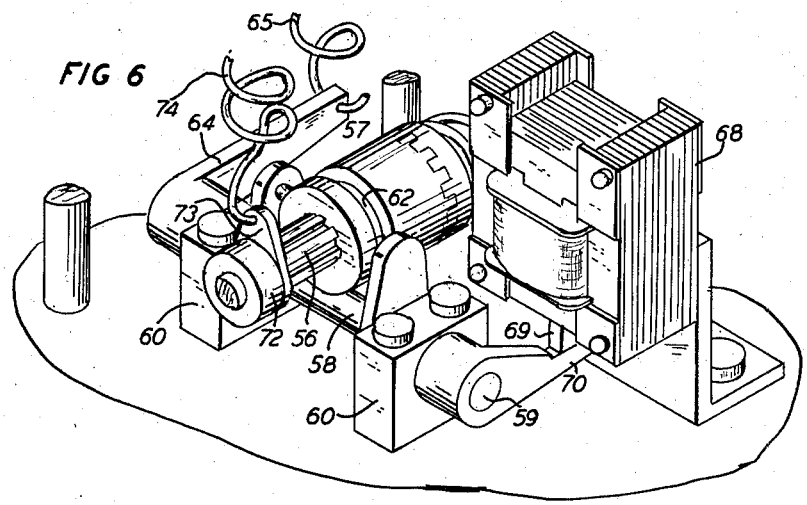
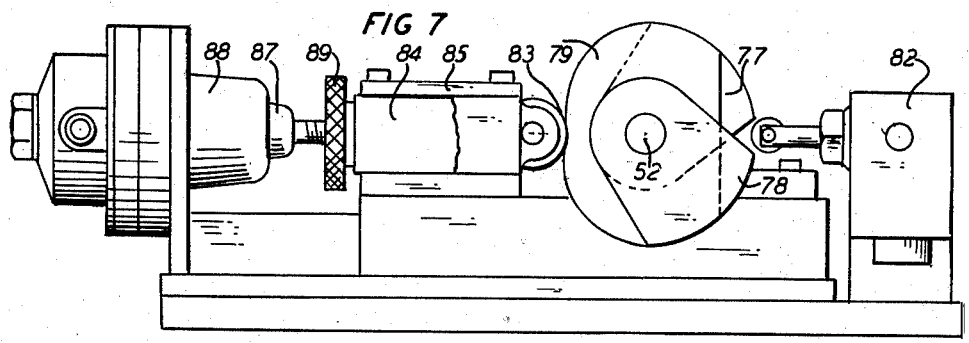
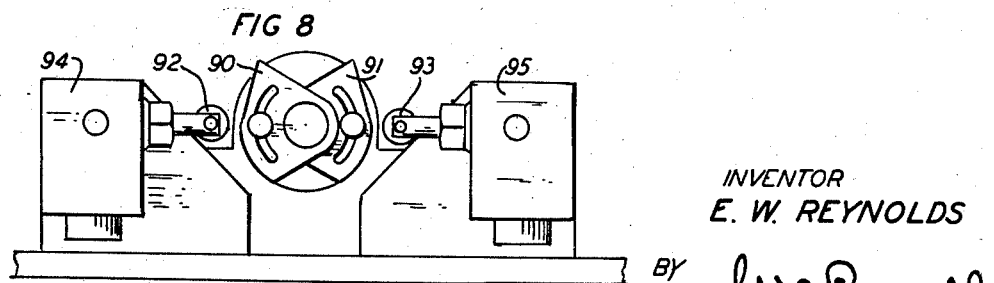
INVENTOR
E. W. REYNOLDS
BY *W. E. Parnell*
ATTORNEY

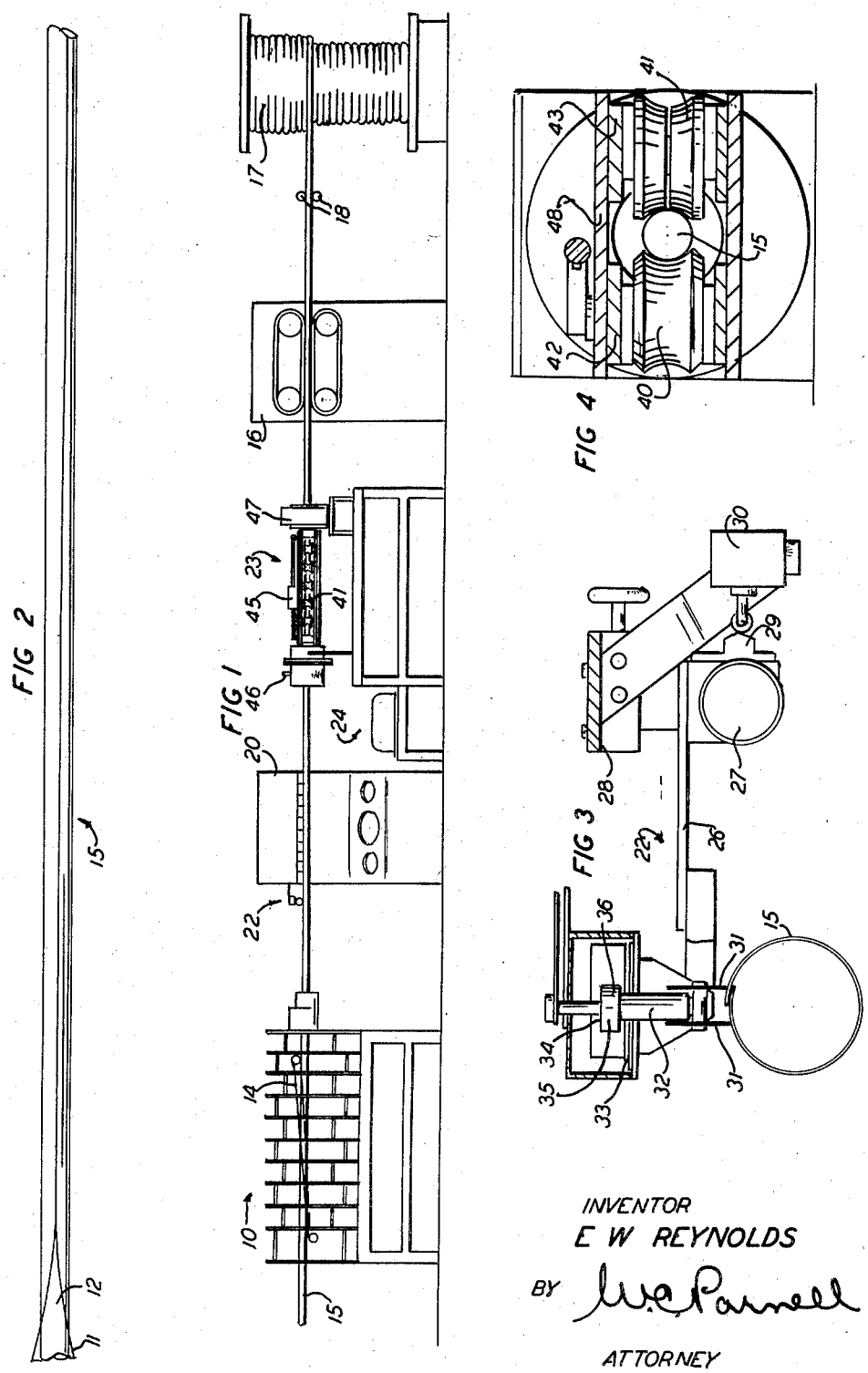
Oct. 28, 1958    E. W. REYNOLDS    2,857,871
SYSTEM FOR MAINTAINING A STRAIGHT SEAM IN
THE MANUFACTURE OF TUBING
Filed Dec. 8, 1953      4 Sheets-Sheet 1
INVENTOR
E W REYNOLDS
BY *[signature]*
ATTORNEY

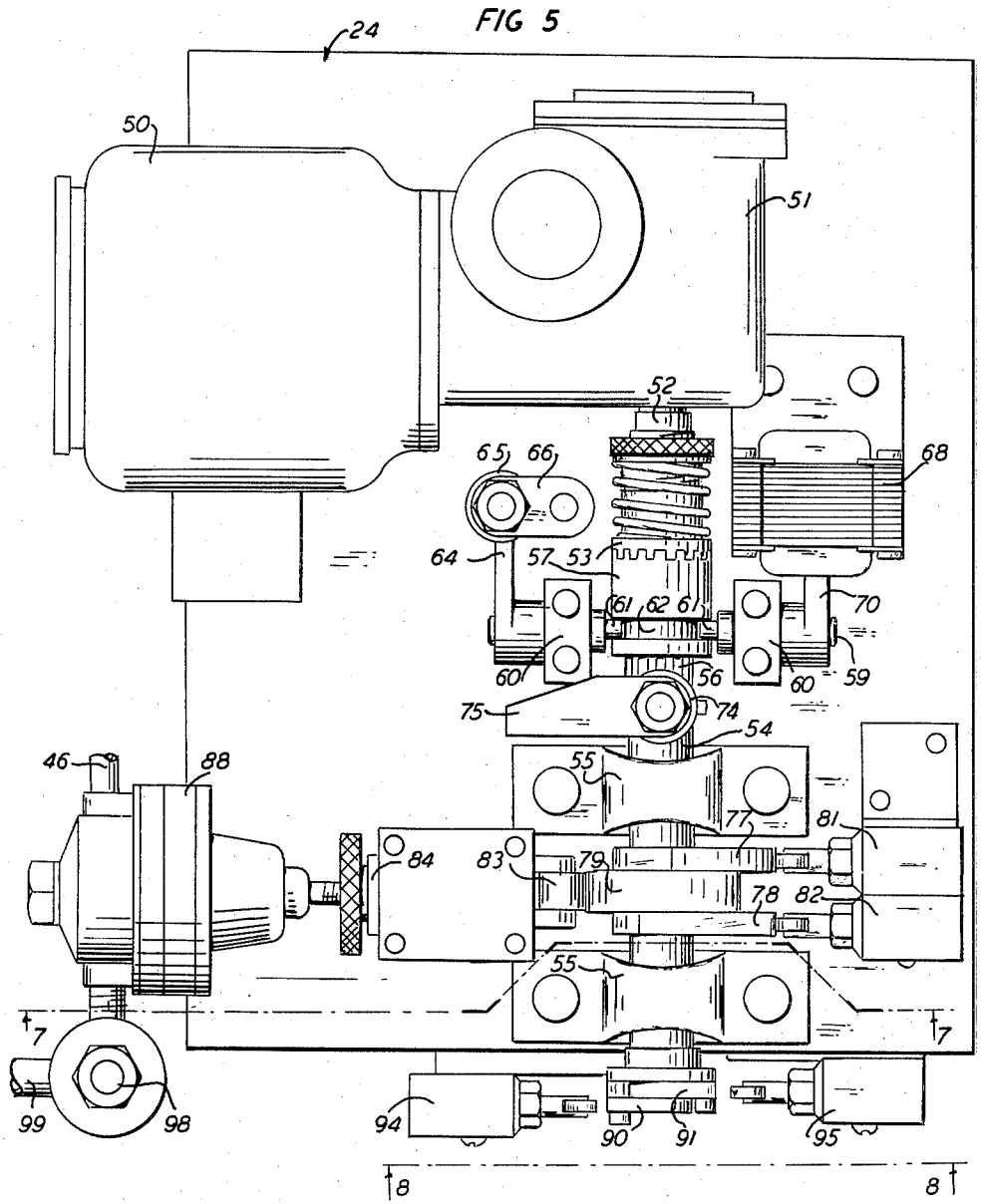

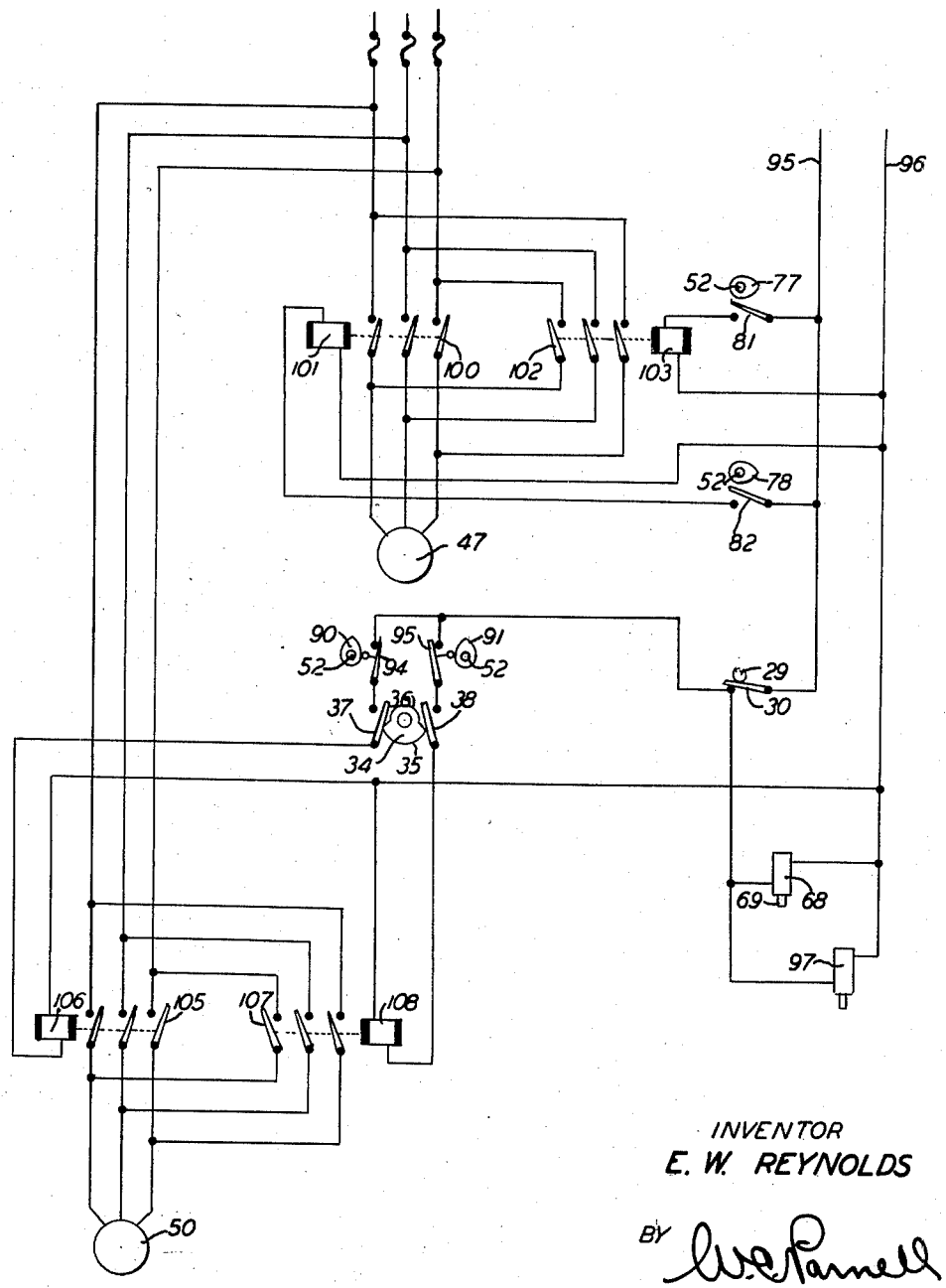

United States Patent Office 2,857,871
Patented Oct. 28, 1958

2,857,871

SYSTEM FOR MAINTAINING A STRAIGHT SEAM IN THE MANUFACTURE OF TUBING

Ellwood W. Reynolds, Watchung, N. J., assignor to Western Electric Company, Incorporated, New York, N. Y., a corporation of New York Application December 8, 1953, Serial No. 396,868

3 Claims. (Cl. 113—59)

This invention relates to tube forming apparatus and more particularly to apparatus for maintaining accurate matching of longitudinal edges of tubular structures formed of strips of material.

During the manufacture of tubes with abutting or overlapping longitudinal edges to form a seam which is to be soldered or welded, it is important that the tubes be held against twisting during their advancement longitudinally relative to the soldering or welding units.

In the manufacture of tubular sheaths for cable cores from strips of metal having laterally extending corrugations, the longitudinal edges of which are to be overlapped to form a longitudinal seam, it is more important that the tubular sheath be held against twisting. In tubes or sheaths of this type the corrugated overlapping edges will remain matched and in interfitting engagement with each other only as long as the seam remains in a straight line parallel with the axis of the tube. Even a very slight deviation of the seam in either direction from the straight line will result in mismatching of the corrugated overlapping edges of the seam, preventing the production of a most efficient soldering or welding of the overlapping edges.

The object of the invention is an apparatus which is highly sensitive to any deviations of a longitudinal seam of a longitudinally movable tubular article and capable of removing any twist tending to form in the tube to maintain the seam straight.

With this and other objects in view, the invention comprises a sensing unit disposed in engagement with the tube and responsive to the deflection of the seam thereof in either direction from a straight line parallel with the axis of the tube and means responsive to the sensing unit to twist the tube in the opposite direction to straighten the seam.

Other objects and advantages will be apparent from the following detailed description when considered in conjunction with the accompanying drawings, wherein:

Fig. 1 is a side elevational view of a line of units in a tube or sheath forming machine embodying the invention;

Fig. 2 is a top plan view of the tube or cable sheath illustrating a possible deflection of the seam;

Fig. 3 is a vertical sectional view of the sensing unit;

Fig. 4 is an enlarged vertical sectional view of the straightening unit;

Fig. 5 is a top plan view of the control unit;

Fig. 6 is a fragmentary isometric view of a portion of the control unit adjacent the clutch thereof;

Fig. 7 is a vertical sectional view taken along the line 7—7 of Fig. 5;

Fig. 8 is an end elevational view taken substantially along the line 8—8 of Fig. 5, and Fig. 9 is a wiring diagram for the control and straightening units.

Referring now to the drawings, attention is first directed to Fig. 1 which illustrates a tube forming unit 10 which, in the present embodiment of the invention, is a sheath forming unit or apparatus for bending a strip of metal 11 (Fig. 2) with laterally extending corrugations (not shown) about a cable core 12 so that the edges will overlap and form a longitudinal seam. This forming apparatus is the subject matter of the co-pending application of E. W. Reynolds and H. C. Slechta, Serial No. 308,962, filed September 11, 1952. The unit 10, as disclosed in the said co-pending application, has belts 14 which are driven in directions to assist in the advancement of the metal 11 and core 12 while they also assist in wrapping the metal 11 about the core. The tube or sheathed core 15 is caused to move longitudinally in a given path by a capstan drive 16 toward a driven takeup reel 17 where the tube or sheathed core is distributed on the reel through the aid of a suitable distributing means represented by rollers 18.

A soldering unit 20 is disposed a short distance from the exit end of the forming unit 10 to solder the overlapping edges of the tube or sheath. However, to produce a satisfactory structure, it is important that the seam formed by the longitudinal edges, remain in a straight line parallel with the axis of the tube or sheath. This is more important during the formation of a tube or sheath from a corrugated strip in that the corrugated edges forming the seam may be held in close interfitting engagement with each other as long as the seam is straight and the corrugations of the edges remain matched. However, deviation of the seam in either direction will cause separation of the edges and prevent satisfactory soldering of the edges as they pass through the unit 20.

Manufacturing arrangements of this type are composed of a plurality of units each assigned to perform its particular function, beginning with a separate core and metal strip and ending with a completed tube or sheathed core distributed uniformly on the takeup reel. The strip, of which the tube or sheath is formed, is held against twisting in the unit 10, but the actions of the takeup reel and the distributor directing the tube or sheathed core thereon produce certain conditions which tend to twist the tube or sheathed core in one direction or the other. To overcome these conditions and to maintain the seam of the tube substantially straight as it passes through the soldering unit 20, three additional units have been added to the aforementioned units including a sensing unit 22, a straightening unit 23 and a control unit 24. The sensing unit 22 may be of any desired type which is responsive to deviations in the seam from a straight line at a given position depending upon whether or not the metal strip of which the tube or sheath is formed is initially plain or corrugated. The illustration of a sensing unit for a corrugated tube is the subject matter of Patent 2,710,394, and the straightening unit 23 for tubes made of either plain or corrugated strips is the subject matter of the co-pending application of W. C. Ewaldson and C. A. Hallam, Serial No. 396,946, filed December 8, 1953.

The sensing unit 22 is shown, more in detail in Fig. 3, mounted in advance of the entrance end of the soldering unit 20 and including an arm 26 pivoted at 27 on a fixed support 28 and movable into and out of the operating position shown where a cam 29 will operate a normally open switch 30 into closed position and will position wheels 31 into engagement with the tube or sheath 15 upon opposite sides of the seam thereof. If the metal strip for the sheath or tube is initially plain, the wheels 31 may be formed of any suitable material so that there will be no sliding or slipping of the wheels on the tube. However, if the sheath or tube is formed of laterally corrugated material, the wheels 31 are provided with teeth (not shown) formed to match and interengage the corrugations so that any deviation of the seam of the tube from a straight line causing mismatching of the edges forming the seam will apply opposing motions to the wheels causing them to rock the element 32 which supports them. The element 32 is itself rockably supported in a housing-like portion 33 at the forward end of the arm 26 and has a cam 34 fixed thereto with a high portion 35 and a low portion 36. When the seam is straight, switches 37 and 38 (shown only in Fig. 9) are allowed to remain normally open but are singly actuated into closed positions by rocking motion of the element 32 in one direction or the other.

The straightening unit 23 includes two sets of rollers 40 and 41 of suitable resilient material mounted for rotation in holders 42 and 43 which are identical in structure and actuable through a suitable mechanism including racks and pinions driven by a fluid operable unit 45 by receiving fluid under variable pressures from a fluid line 46. Furthermore, a reversible motor drive 47 is operatively connected to a carriage 48 in which the rollers and their holders are movably mounted so that, through the function of the straightening unit 23, variable like forces may be applied simultaneously to the series of rollers causing them to grip the tube or cable sheath, and the drive means 47 may be energized in either direction depending upon the direction of deviation of the seam of the tube or sheath to straighten it.

The control unit 24 (shown in Figs. 5 to 8 inclusive) includes a reversible motor 50 driving a speed reducing unit 51, which has an output shaft 52 provided with a clutch member 53. A driven shaft 54 journalled in bearings 55 has a splined end 56 on which a clutch member 57 is mounted and slidably connected thereto. A yoke 58 mounted on a spindle 59, which is journalled in bearing 60, has inwardly projecting pins 61 which interengage an annular groove 62 of the clutch member 57. A lever 64 mounted on one end of the spindle 59 has a spring 65 fixed thereto, the other end of the spring being connected to a fixed bracket 66 so that, through the force of the spring, the clutch member 57 will be urged into open position free of the clutch member 53.

A solenoid 68 is mounted at a position so that its core or plunger 69 (Figs. 6 and 9) may engage the adjacent end of a lever 70 which is mounted on the spindle 59 and actuable during energization of the solenoid to force the clutch closed, that is actuation of the yoke 58 to move the member 57 to cause intermeshing of the teeth of the clutch members 57 and 53. A splined collar 72 is mounted on the splined portion 56 of the shaft 54 and is made a part of a lever 73 which is connected to a spring 74, the upper end of the spring being connected to a fixed bracket 75 (Fig. 5) to apply sufficient force to the lever 73 to return the shaft 54 to a normal position when such an occasion arises that this is possible.

Three cams 77, 78 and 79 are mounted on the shaft 54 between the bearings 55. The cams 77 and 78 are of the contours shown in Fig. 7 and are adapted to actuate their respective switches 81 or 82 depending on the direction or rotation of the shaft 54. The cam 79 (as shown in Fig. 7) has a low portion engaging a roller 83 of a plunger 84 supported for reciprocation in bearing 85. Suitable means (not shown) normally urge the roller 83 of the plunger into engagement with the low portion of the cam 79, and when in this position, the movable portion 87 of a valve 88 will be at its outermost or closed position, this portion of the valve including an adjustable head 89. It will be noted that rocking motion of the shaft 54 in either direction will move increasingly higher portions of the cam 79 into engagement with the roller 83 to actuate the valve 88 by moving the member 87 variable distances inwardly to thereby cause the valve to direct a fluid with variable or increasing pressures through a fluid line 46 to the straightening unit 23 (Fig. 1).

The free end of the shaft 54 carries cams 90 and 91 adjustable relative to the rollers 92 and 93 of their switches 94 and 95 so that they may function to limit the fluid pressure applied to the rollers of the straightening unit.

Attention now is directed to Fig. 9 which illustrates the wiring diagram for the control unit including the cam 34 of the sensing unit 22 with its switches 37 and 38 and also the motor drive 47 for the straightening unit 23. The wiring diagram illustrates lines 95 and 96 from a 110 v. alternating current supply. When the sensing device 22 is in its operating position (shown in Fig. 3) the cam 29 closes the normally open switch 30 to complete circuits through solenoid 68 and solenoid 97. The solenoid 68, when energized, will close the clutch 53—57 and hold it closed as long as the switch 30 remains closed. The solenoid 97 operates a valve 98 (Fig. 5) into open position allowing fluid under a desired maximum pressure from a supply line 99 to pass into the valve 88.

The motors 47 and 50 are shown for connection with a three phase 440 v. supply. The reversible motor drive 47 is under the control of contacts 100 of a relay 101 and contacts 102 of a relay 103. Relay 101 is in a circuit with switch 82 and will be energized during closing of the switch 82 by its cam 78. The relay 103 is in a circuit with switch 81 which may be closed by its cam 77. Therefore, it depends upon the direction of rotation of the shaft 54 as to which switch 81 or 82 will be closed to determine the direction of drive of the motor 47.

Motor 50 is under the control of contacts 105 of relay 106 and contacts 107 of relay 108. Relay 106 is in a circuit with switch 37, limit switch 94 and switch 30, while relay 108 is in a circuit with switch 38, limit switch 95 and switch 30.

Considering now the operation of the entire apparatus, let it be assumed that a condition exists tending to put a clockwise twist in the tube or sheathed core looking in the direction of travel thereof (as illustrated in Fig. 2). This condition will be translated through the wheels 31 of the sensing unit to the element 32, rocking it in a direction to cause its cam 34 to close switch 37, completing a circuit through relay 106, to close its contacts 105, to drive the motor 50 in one direction for example, counterclockwise looking from the free end of the shaft 54 in Fig. 5. Energization of the motor 50 with its drive 51 to rotate the shaft 54 counterclockwise, will cause the cam 78 to operate its switch 82 into closed position, energizing relay 101 to close contacts 100 to complete a circuit through the motor 47 to drive it in a counterclockwise direction, looking toward the entrance end of the straightening unit 23. The straightening unit will begin its rotation in a direction opposing the direction of deflection of the seam and, at the same time, the rollers 40 and 41 of the straightening unit will be forced into engagement with the tube or sheathed core under increasing pressure caused by the turning of cam 79 to force the plunger 84 to gradually open the valve 88 to permit fluid to pass through the fluid line 46 to operate the unit 45. The functioning of these units will continue, turning the straightening unit under increasing pressures on the rollers until the seam has been straightened, at which time the sensing device will be affected to the extent that the cam 34 thereof will allow the switch 37 to open. As a safety factor controlling the maximum pressure to be applied to the rollers 42—41, the cams 90 and 91 on the free end of the shaft 54 will operate singly depending on the direction of movement of the shaft to operate its respective switch 94—95 which in the present instance would be the plunger 92 of the switch 94. In this manner, if the desired maximum pressure has been reached before the switch 37 is opened, that is, before the seam is straight, the circuit to relay 106 is opened by opening switch 94. This de-energizes motor 50 but holds the control means in this position due to the fact that the clutch 53—57 remains closed during continued energization of the solenoid 68, holding the shaft 54 and its cams in the present position to allow continued rotation of the straightening unit 23.

If the straightening unit has provided a twisting force greater than that inherent in the tube and has produced an overtwist in the tube, this will affect the sensing unit 22 causing it to rock the element 32 in a direction to close switch 38, thus energizing relay 108 to operate its contacts 107 to energize the motor 50 to drive the shaft 54 clockwise. Attention is directed to the fact that this reverse motion of the shaft 54 begins at the position where its motion counterclockwise stopped, leaving the cams on the shaft in certain positions that is with the switch 82 operated as well as possibly switch 94. Movement of the shaft 54 clockwise will first cause a reduction in the pressure applied through the rollers to the tube or sheathed core due to the fact that the increasingly lower portions of the cam 79 will move relative to the roller 83 effectively decreasing the fluid pressure from the valve 88 to the straightening unit. If the inherent twisting force in the tube or sheathed core is balanced by the twisting force of the straightening unit 23 after rocking movement of the shaft 54 clockwise a given distance less than that required to return the cams to their normal positions, this balancing effect will again return the seam of the tube to a straight line and the sensing unit will be balanced causing its cam 34 to permit opening of switch 38. This condition continues to exist and the shaft 54 may remain idle as its motor 50 has again been de-energized through the opening of the switch 38 and it may be presumed that the required pressure through the valve 88 to the straightening unit 23 coupled with the rotating force of the straightening unit has been made sufficient to counteract the inherent opposing twisting force in the tube or sheathed core.

It will be apparent that a tube or sheathed core, free of any constant tendency to twist it in one direction but subject to twist in either direction through any causes, will immediately cause actuation of either switch 37 or 38 through the function of the sensing unit 22 and start operation of the straightening unit 23 through the efficient actuation of the control unit 24, maintaining or varying these conditions depending upon the twist in the cable or tube, the directions of these twists and the forces required to counteract them to maintain the seam of the tube or sheathed core straight as it passes through the soldering unit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with a unit for bending a strip of material into a tube with a longitudinal seam of overlapping edges while holding the tube against twisting, a fixed position means for bonding the seam and means for advancing the tube relative to the bonding means in a longitudinal path, of means operable to maintain the seam parallel with the axis of the tube including a sensing unit disposed in advance of the bonding means, said sensing unit having elements positioned normally in parallel alignment with the tube axis, the elements being in contacting frictional engagement with the tube adjacent both sides of the seam and being caused to move out of said normal position by any deviation of the seam out of parallel with the axis of the tube, straightening elements positioned beyond the bonding means operatively connected to the sensing unit, the movement of the sensing elements from their normal position causing the straightening elements to apply a continuing torque to the tube in a direction opposing the direction of movement of the seam out of parallel until the seam is parallel with the axis.

2. The combination with a unit for bending a laterally corrugated strip of material into a tube with a longitudinal seam of matched overlapping edges while holding the tube against twisting, a fixed position means for bonding the seam and means for advancing the tube in a longitudinal path relative to the bonding means, of means operable to maintain the seam parallel with the axis of the tube including a sensing unit disposed in advance of the bonding means, said sensing unit having elements positioned normally in parallel alignment with the tube axis, the elements being in contacting frictional engagement with the tube adjacent both sides of the seam and being moved out of said normal position by any deviation of the seam out of parallel with the axis of the tube, straightening elements positioned beyond the bonding means operatively connected to the sensing unit, the movement of the sensing elements from their normal position causing the straightening elements to apply a continuing torque to the tube in a direction opposing the direction of movement of the seam out of parallel until the seam is parallel with the axis and the overlapping corrugated edges are moved into matched engagement with each other.

3. The combination with a unit for bending a strip of material into a tubular sheath about a cable core with a longitudinal seam of overlapping edges while holding the tubular sheath against twisting, a fixed position means for bonding the seam and means including a driven takeup reel for advancing the strip of material with the core through the unit in a longitudinal path relative to the bonding means, of means operable to maintain the seam parallel with the axis of the tubular sheath including a sensing unit disposed in advance of the bonding means, said sensing unit having elements positioned normally in parallel alignment with the sheath axis, the elements being in contacting frictional engagement with the sheath adjacent both sides of the seam and being moved out of said normal position by any deviation of the seam out of parallel with the axis of the sheath, straightening elements positioned beyond the bonding means operatively connected to the sensing unit, the movement of the sensing elements from their normal position causing the straightening elements to apply a continuing torque to the sheath in a direction opposing the direction of movement of the seam out of parallel until the seam is parallel with the axis.

References Cited in the file of this patent

UNITED STATES PATENTS

| | | |
|---|---|---|
| 1,997,272 | Adams | Apr. 9, 1935 |
| 2,499,853 | Eckel et al. | Mar. 7, 1950 |
| 2,526,723 | Berkeley | Oct. 24, 1950 |
| 2,557,046 | Evans | June 12, 1951 |
| 2,710,394 | Hallam et al. | June 7, 1955 |